United States Patent
Yi et al.

(10) Patent No.: US 11,363,474 B2
(45) Date of Patent: Jun. 14, 2022

(54) METHOD AND APPARATUS FOR PERFORMING MEASUREMENT IN WIRELESS COMMUNICATION SYSTEM

(71) Applicant: LG Electronics Inc., Seoul (KR)

(72) Inventors: Yunjung Yi, Seoul (KR); Hyunsoo Ko, Seoul (KR); Sukhyon Yoon, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 16/757,856

(22) PCT Filed: Nov. 19, 2018

(86) PCT No.: PCT/KR2018/014184
§ 371 (c)(1),
(2) Date: Apr. 21, 2020

(87) PCT Pub. No.: WO2019/098786
PCT Pub. Date: May 23, 2019

(65) Prior Publication Data
US 2021/0195449 A1    Jun. 24, 2021

Related U.S. Application Data

(60) Provisional application No. 62/588,313, filed on Nov. 17, 2017.

(51) Int. Cl.
*H04W 24/06* (2009.01)
*H04W 24/08* (2009.01)
(Continued)

(52) U.S. Cl.
CPC .......... *H04W 24/08* (2013.01); *H04B 17/318* (2015.01); *H04L 5/0048* (2013.01)

(58) Field of Classification Search
CPC ..... H04W 24/08; H04B 17/318; H04L 5/0048
See application file for complete search history.

(56) References Cited

U.S. PATENT DOCUMENTS

2019/0044631 A1* 2/2019 Davydov ............ H04L 25/0224
2019/0149253 A1* 5/2019 Yoon ........................ H04B 7/26
370/252

(Continued)

FOREIGN PATENT DOCUMENTS

EP          2963965        1/2016
WO       2015163633       10/2015

OTHER PUBLICATIONS

Huawei et al., "Remaining details on NR RRM measurement based on SS block and CSI-RS for L3 mobility," R1-1717054, 3GPP TSG RAN WG1 Meeting 90bis, Prague, Czech Republic, Oct. 2, 2017, see section 3.

(Continued)

*Primary Examiner* — Duc C Ho
(74) *Attorney, Agent, or Firm* — Dentons US LLP

(57) ABSTRACT

A method and apparatus for measuring a reference signal strength indication (RSSI) in a wireless communication system is provided. When a semi-static downlink/uplink (DL/UL) configuration or a dynamic slot formation indication (SFI) is not received from a network, a user equipment (UE) determines RSSI measurement resources based on detected synchronization signal (SS)/physical broadcast channel (PBCH) block, and measuring the RSSI based on the RSSI measurement resources.

15 Claims, 14 Drawing Sheets

(51) Int. Cl.
*H04B 17/318* (2015.01)
*H04L 5/00* (2006.01)

(56) References Cited

U.S. PATENT DOCUMENTS

2019/0200306 A1\* 6/2019 Ko .................. H04B 7/0617
2020/0029315 A1\* 1/2020 Lin .................. H04L 5/0051

OTHER PUBLICATIONS

Intel Corporation, "RRM Measurements for NR," R1-1717359, 3GPP TSG RAN WG1 Meeting 90bis, Prague, Czech Republic, Oct. 3, 2017, see section 2.
OPPO, "Remaining details on NR RRM measurement," R1-1718060, 3GPP TSG RAN WG1 Meeting 90bix, Prague, Czech Republic, Sep. 30, 2017, see section 2.

\* cited by examiner

METHOD AND APPARATUS FOR PERFORMING MEASUREMENT IN WIRELESS COMMUNICATION SYSTEM

This application is the National Stage filing under 35 U.S.C. 371 of International Application No. PCT/KR2018/014184, filed on Nov. 19, 2018, which claims the benefit of U.S. Provisional Application No. 62/588,313 filed on Nov. 17, 2017, the contents of which are all hereby incorporated by reference herein in their entirety.

TECHNICAL FIELD

The present invention relates to wireless communications, and more particularly, to a method and apparatus for performing measurement in a new radio access technology (RAT) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR uses symbol-level time alignment for transmission schemes using various slot lengths, mini-slots, and different subcarrier spacing, so as to provide flexibility for effectively multiplexing various services such as eMBB and URLLC in time and frequency domain. Also, unlike LTE, NR defines the uplink/downlink resource allocation as a symbol level within one slot. A slot structure capable of transmitting hybrid automatic repeat request (HARQ) acknowledgment/non-acknowledgment (ACK/NACK) directly in a transmission slot to reduce HARQ delay is defined, and this slot structure is called a self-contained structure. Also, unlike conventional LTE, NR supports a common frame structure that forms a frequency division duplex (FDD) or a time division duplex (TDD) frame through a combination of various slots. Also, by introducing dynamic TDD scheme, it is possible to freely and dynamically adjust the transmission direction of individual cells according to traffic characteristics.

SUMMARY

In NR, a semi-static downlink/uplink (DL/UL) configuration and/or dynamic slot format indication (SFI) may be used to indicate a slot structure to the UE. The UE may perform measurement in DL resources determined based on the semi-static DL/UL configuration and/or dynamic SFI. However, when the semi-static DL/UL configuration and/or dynamic SFI is not indicated to the UE, how to perform measurement may be a problem.

In an aspect, a method for measuring a reference signal strength indication (RSSI) by a user equipment (UE) in a wireless communication system is provided. The method includes detecting that a semi-static downlink/uplink (DL/UL) configuration or a dynamic slot formation indication (SFI) is not received from a network, determining RSSI measurement resources based on detected synchronization signal (SS)/physical broadcast channel (PBCH) blockm, and measuring the RSSI based on the RSSI measurement resources.

In another aspect, a user equipment (UE) in a wireless communication system is provided. The UE includes a memory, a transceiver, and a processor, operably coupled to the memory and the transceiver, that detects that a semi-static downlink/uplink (DL/UL) configuration or a dynamic slot formation indication (SFI) is not received from a network, determines RSSI measurement resources based on detected synchronization signal (SS)/physical broadcast channel (PBCH) block, and measures a reference signal strength indication (RSSI) based on the RSSI measurement resources.

Even when the semi-static DL/UL configuration and/or dynamic SFI is not indicated to the UE, the UE can perform measurement effectively.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
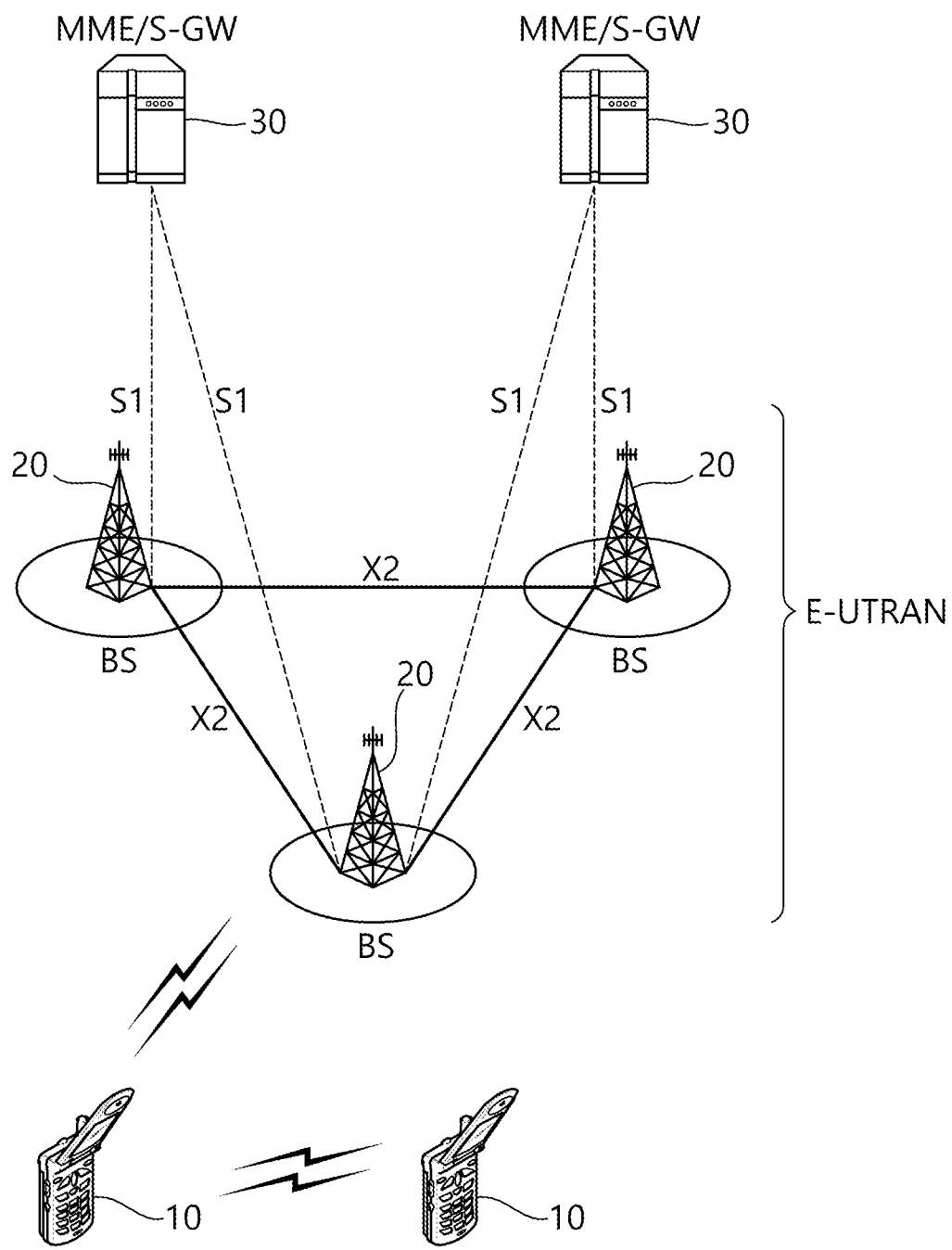
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
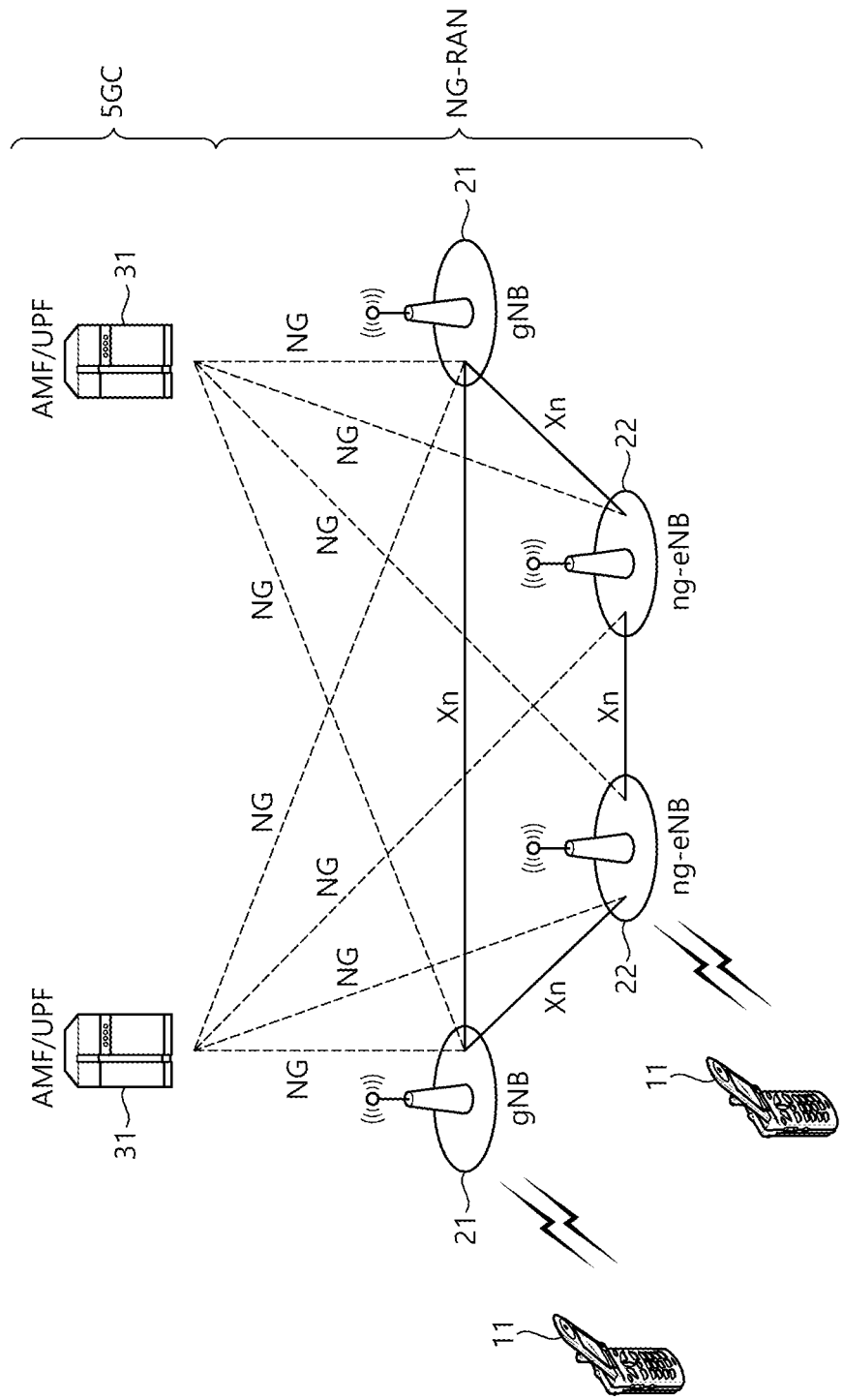
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

Hereinafter, frame structure/physical resources in NR is described.

In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

In NR, DL and UL transmissions are performed over a radio frame with a duration of 10 ms. Each radio frame includes 10 subframes. Thus, one subframe corresponds to 1 ms. Each radio frame is divided into two half-frames.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu=0$, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

One subframe includes $N_{symb}^{subframe,\mu} = N_{symb}^{slot} * N_{slot}^{subframe,\mu}$ consecutive OFDM symbols. In NR, a number of slots and a number of symbols included in one radio frame/subframe may be different according to various numerologies, i.e. various subcarrier spacings.

Table 2 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in normal cyclic prefix (CP).

TABLE 2

| $\mu$ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to $\mu=0$ is applied, one radio frame includes 10 subframes, one subframe includes to one slot, and one slot consists of 14 symbols.

Table 3 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in extended CP.

TABLE 3

| $\mu$ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 2 | 12 | 40 | 4 |

Referring to Table 3, $\mu=2$ is only supported in extended CP. One radio frame includes 10 subframes, one subframe includes to 4 slots, and one slot consists of 12 symbols.

In the present specification, a symbol refers to a signal transmitted during a specific time interval. For example, a symbol may refer to a signal generated by OFDM processing. That is, a symbol in the present specification may refer to an OFDM/OFDMA symbol, or SC-FDMA symbol, etc. A CP may be located between each symbol.

Figure 3:
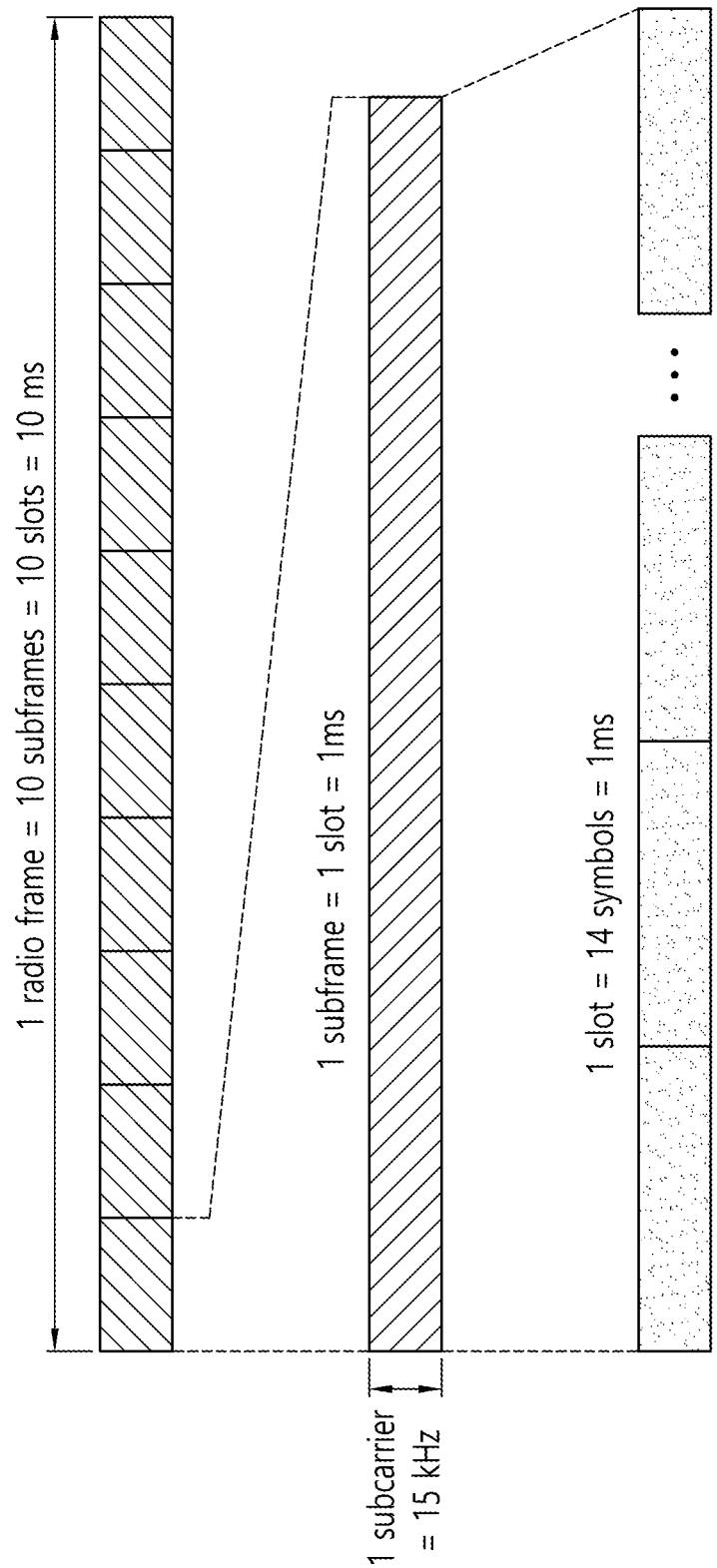
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to $\mu=0$.

Figure 4:
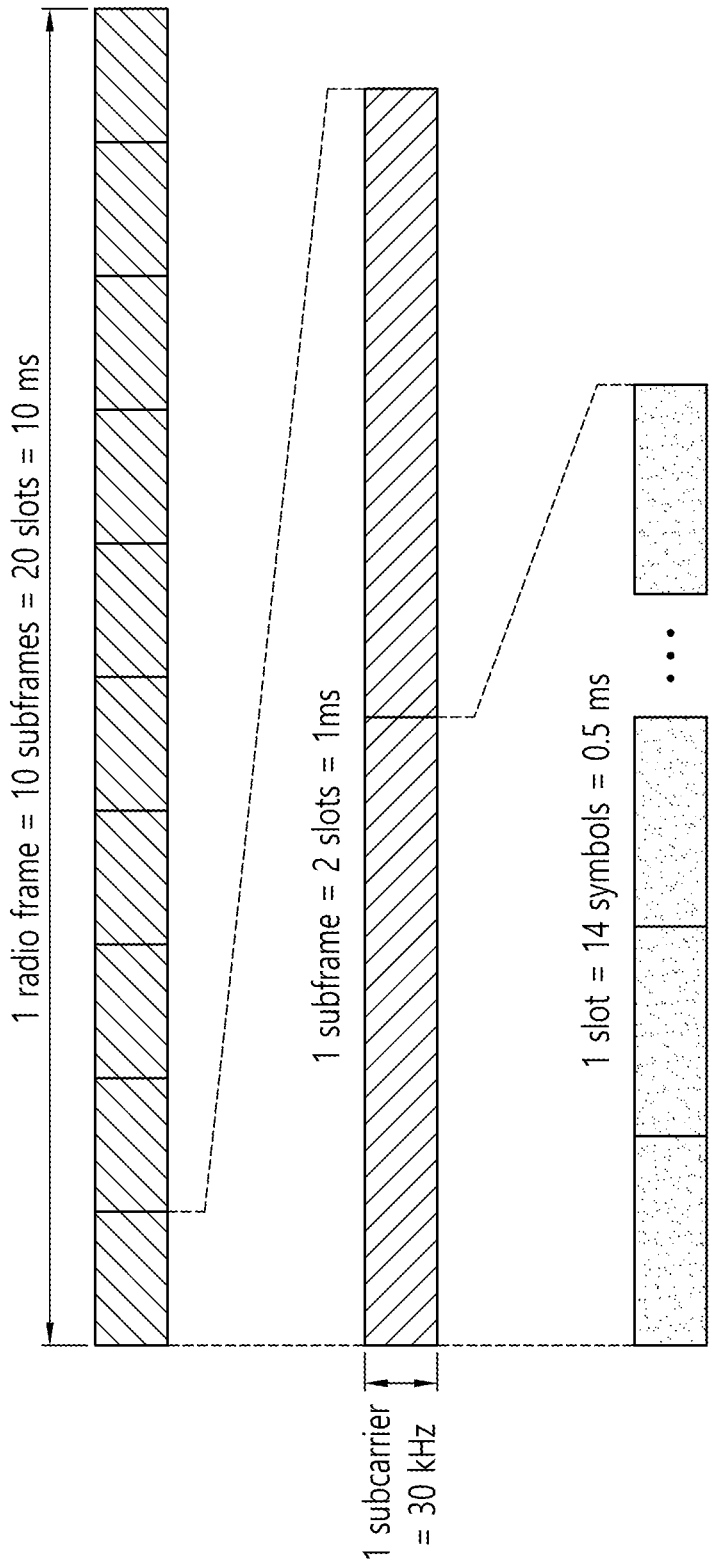
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to $\mu=1$.

Meanwhile, a frequency division duplex (FDD) and/or a time division duplex (TDD) may be applied to a wireless communication system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols. The flexible symbol may be referred to as another terminology, such as reserved symbol, other symbol, unknown symbol, etc.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
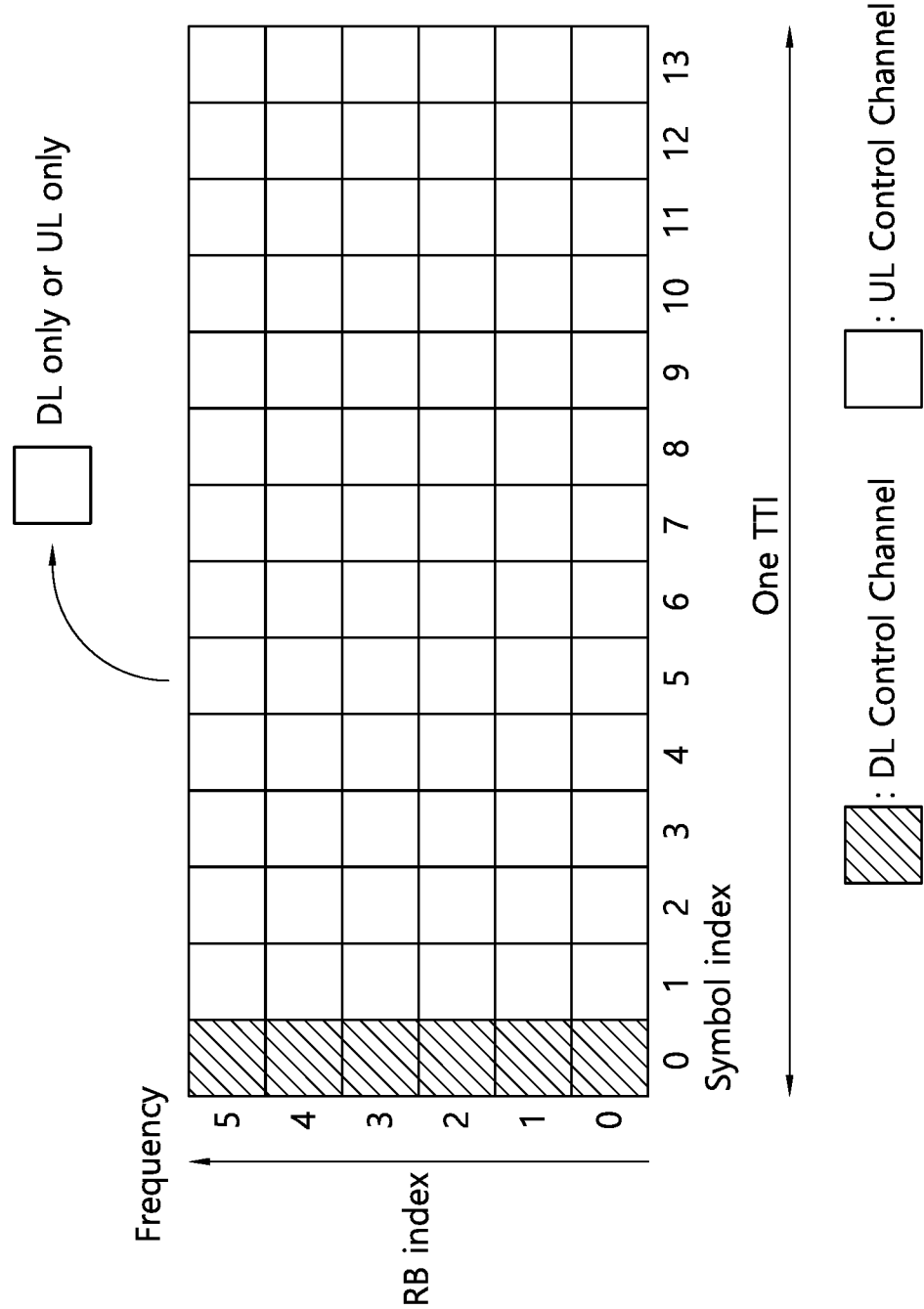
FIG. 5 shows an example of a subframe structure used to minimize latency of data transmission when TDD is used in NR.

FIG. 5 shows an example of a subframe structure used to minimize latency of data transmission when TDD is used in NR. The subframe structure shown in FIG. 5 may be called a self-contained subframe structure.

Referring to FIG. 5, the subframe includes DL control channel in the first symbol, and UL control channel in the last symbol. The remaining symbols may be used for DL data transmission and/or for UL data transmission. According to this subframe structure, DL transmission and UL transmission may sequentially proceed in one subframe. Accordingly, the UE may both receive DL data and transmit UL acknowledgement/non-acknowledgement (ACK/NACK) in the subframe. As a result, it may take less time to retransmit data when a data transmission error occurs, thereby minimizing the latency of final data transmission.

In the self-contained subframe structure, a time gap may be required for the transition process from the transmission mode to the reception mode or from the reception mode to the transmission mode. For this purpose, some symbols at the time of switching from DL to UL in the subframe structure may be set to the guard period (GP).

Figure 6:
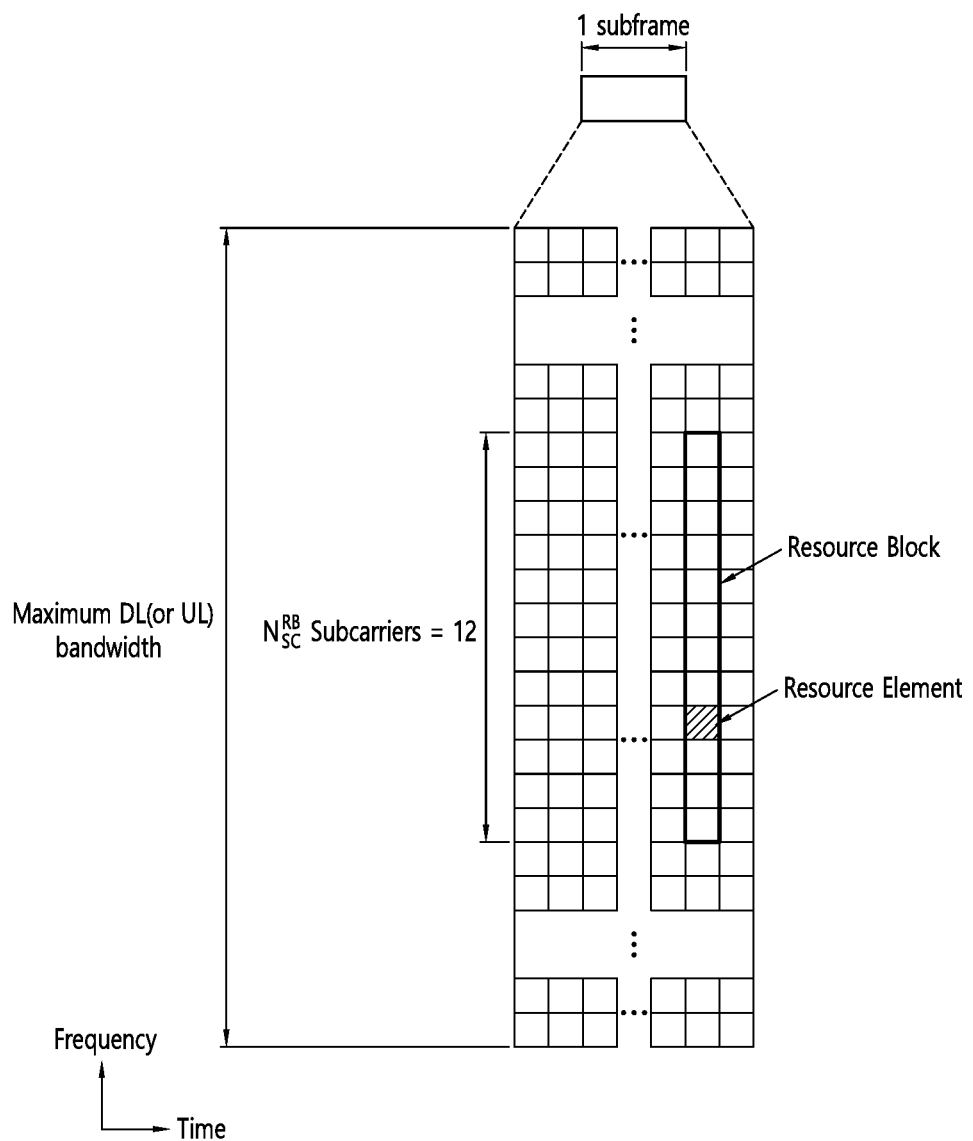
FIG. 6 shows an example of a resource grid to which technical features of the present invention can be applied.

FIG. 6 shows an example of a resource grid to which technical features of the present invention can be applied. An example shown in FIG. 6 is a time-frequency resource grid used in NR. An example shown in FIG. 6 may be applied to UL and/or DL.

Referring to FIG. 6, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

Hereinafter, a cell search in NR is described.

The UE may perform cell search in order to acquire time and/or frequency synchronization with a cell and to acquire a cell identifier (ID). Synchronization channels such as PSS, SSS, and PBCH may be used for cell search.

Figure 7:
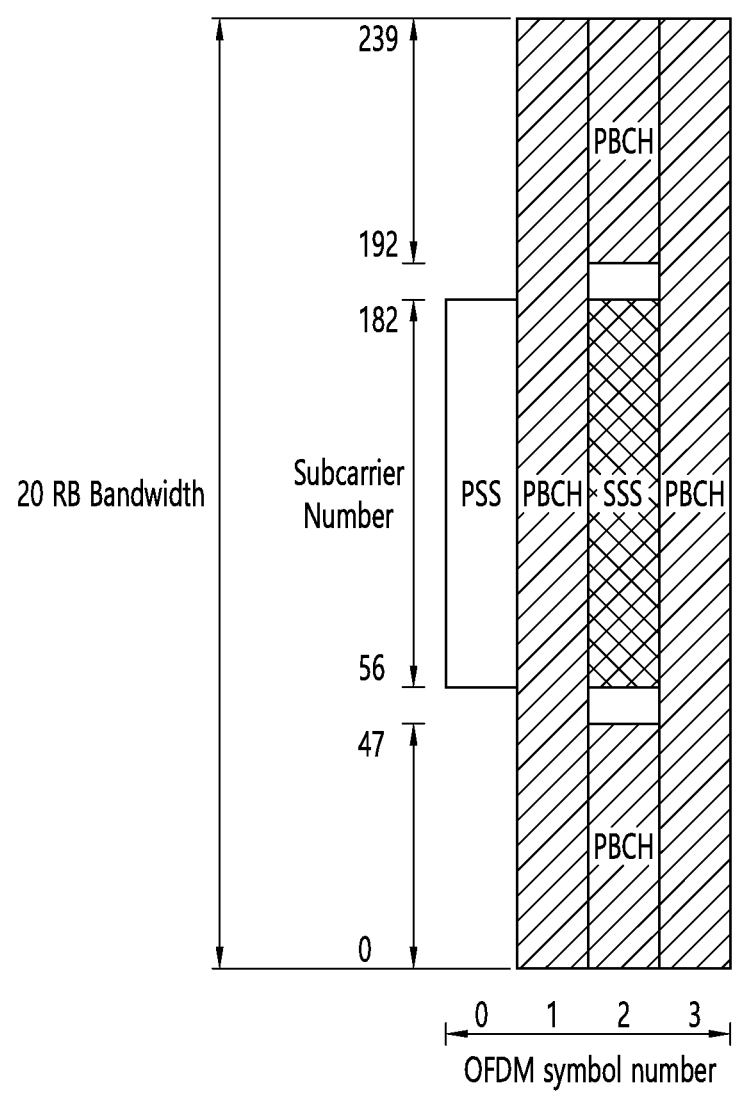
FIG. 7 shows an example of a synchronization channel to which technical features of the present invention can be applied.

FIG. 7 shows an example of a synchronization channel to which technical features of the present invention can be applied. Referring to FIG. 7, the PSS and SSS may include one symbol and 127 subcarriers. The PBCH may include 3 symbols and 240 subcarriers.

The PSS is used for synchronization signal (SS)/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g. random access operations). The SS/PBCH block may be repeated by a specific period. The repetition period may be configured individually according to the numerology.

Referring to FIG. 7, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SS/PBCH block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

Hereinafter, DL control channel in NR is described.

The search space for the PDCCH corresponds to aggregation of control channel candidates on which the UE performs blind decoding. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET is a set of resources for control signal transmission. The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

The base station may transmit information on the CORESET to the UE. For example, information on the CORESET configuration may be transmitted for each CORESET. Via the information on the CORESET configuration, at least one of a time duration of the corresponding CORESET (e.g. 1/2/3 symbol), frequency domain resources (e.g. RB set), REG-to-CCE mapping type (e.g. whether interleaving is applied or not), precoding granularity, a REG bundling size (when the REG-to-CCE mapping type is interleaving), an interleaver size (when the REG-to-CCE mapping type is interleaving) and a DMRS configuration (e.g. scrambling ID) may be transmitted. When interleaving to distribute the CCE to 1-symbol CORESET is applied, bundling of two or six REGs may be performed. Bundling of two or six REGs may be performed on the two symbols CORESET, and time first mapping may be applied. Bundling of three or six REGs may be performed on the three symbols CORESET, and a time first mapping may be applied. When REG bundling is performed, the UE may assume the same precoding for the corresponding bundling unit.

In NR, the search space for the PDCCH is divided into CSS and USS. The search space may be configured in CORESET. As an example, one search space may be defined in one CORESET. In this case, CORESET for CSS and CORESET for USS may be configured, respectively. As another example, a plurality of search spaces may be defined in one CORESET. That is, CSS and USS may be configured in the same CORESET. In the following example, CSS means CORESET in which CSS is configured, and USS means CORESET in which USS is configured. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation in NR is described.

In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 8:
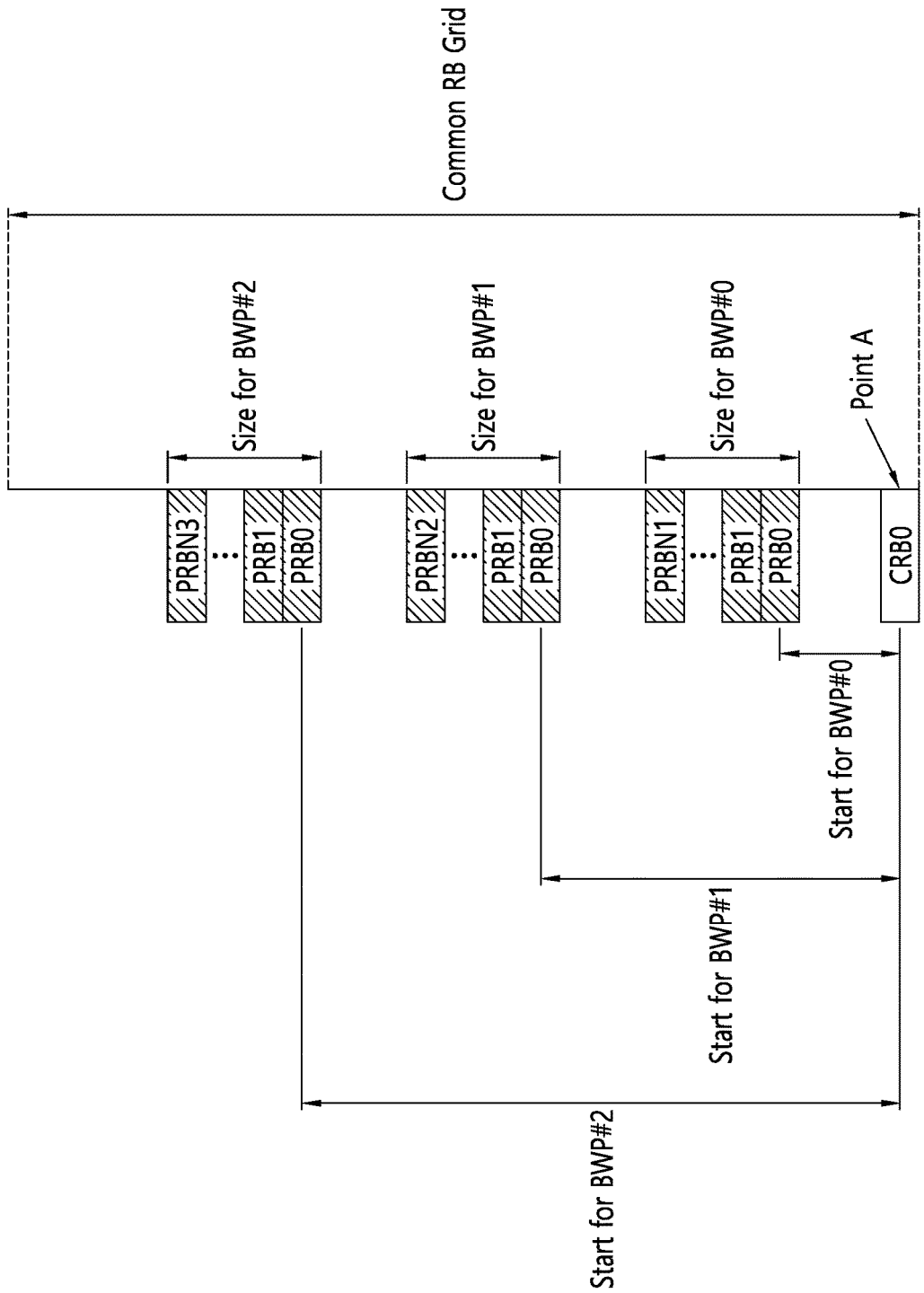
FIG. 8 shows an example of a frequency allocation scheme to which technical features of the present invention can be applied. R

FIG. 8 shows an example of a frequency allocation scheme to which technical features of the present invention can be applied. Referring to FIG. 8, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SS/PBCH block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 8 is configured to one cell (e.g. primary cell (PCell)). A plurality of BWPs may be configured for each cell individually or commonly.

Referring to FIG. 8, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g. up to four) of BWPs may be configured for the UE. Even if a plurality of BWPs are configured, only a specific number (e.g. one) of BWPs may be activated per cell for a given time period. However, when the UE is configured with a supplementary uplink (SUL) carrier, maximum of four BWPs may be additionally configured on the SUL carrier and one BWP may be activated for a given time. The number of configurable BWPs and/or the number of activated BWPs may be configured commonly or individually for UL and DL. Also, the numerology and/or CP for the DL BWP and/or the numerology and/or CP for the UL BWP may be configured to the UE via DL signaling. The UE can receive PDSCH, PDCCH, channel state information (CSI) RS and/or tracking RS (TRS) only on the active DL BWP. Also, the UE can transmit PUSCH and/or physical uplink control channel (PUCCH) only on the active UL BWP.

Figure 9:
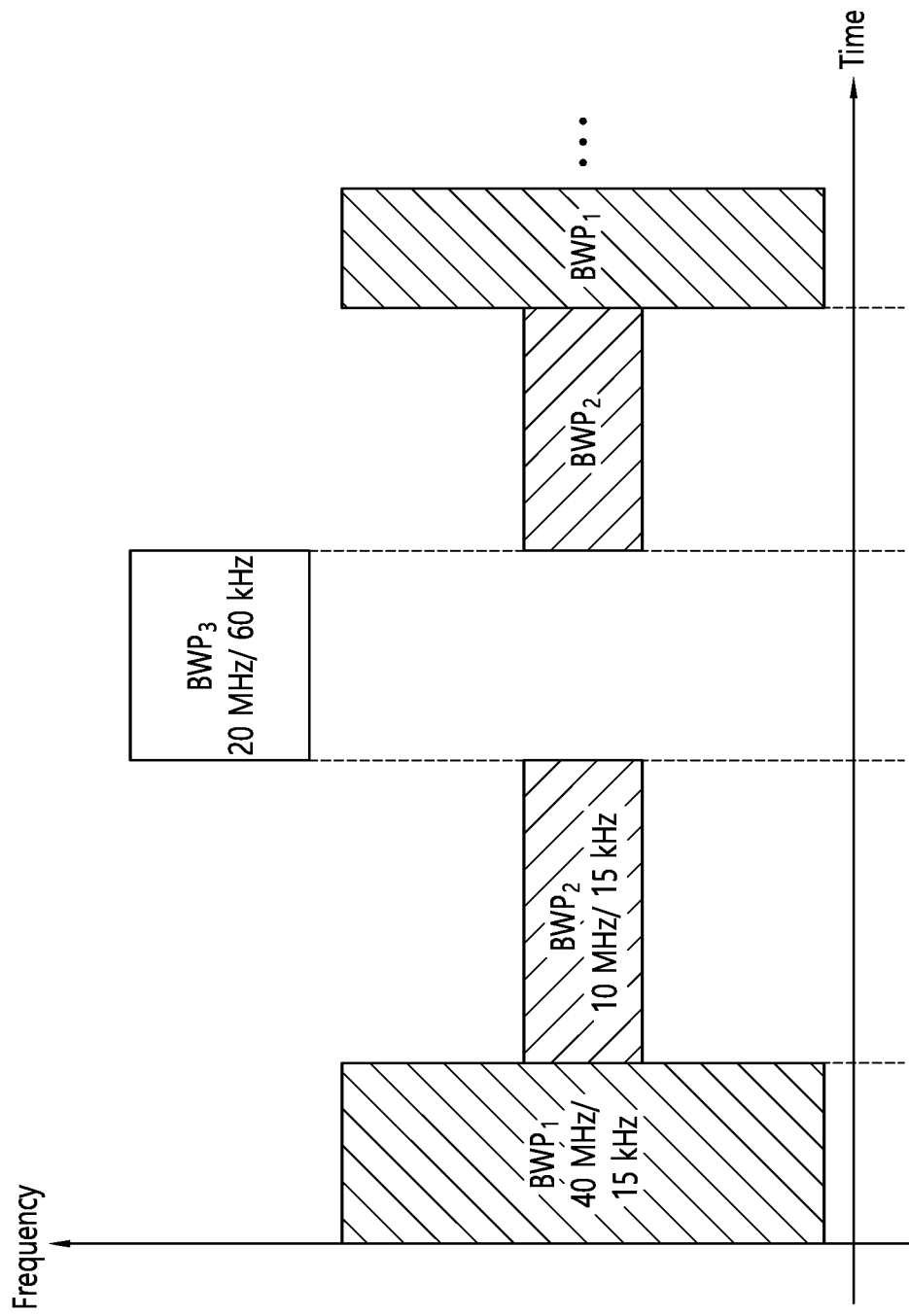
FIG. 9 shows an example of multiple BWPs to which technical features of the present invention can be applied.

FIG. 9 shows an example of multiple BWPs to which technical features of the present invention can be applied. Referring to FIG. 9, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

As described above, a slot format is configured in NR. The slot format may be configured semi-statically via RRC signaling. The slot format configured semi-statically via RRC signaling is the first applied information on the slot format. The RRC signaling may be transmitted in a cell specific manner, and may also be transmitted in a UE specific manner A symbol determined as a flexible symbol by a slot format configured semi-statically may be updated with a DL symbol or a UL symbol at a later time by a semi-static configuration, a group common PDCCH, a UE scheduling DCI, etc.

The group common PDCCH is a channel through which the group common DCI is transmitted. The group common DCI may correspond to DCI format 2_0. The group common PDCCH is a channel commonly transmitted to UEs of a group defined by a specific criterion. The group may be configured by slot format indication RNTI (SFI-RNTI) which scrambles group common DCI. A UE included in the group may include a scheduled UE and an unscheduled UE. The UE may be separately configured via RRC signaling to determine whether it should receive the group common DCI via the group common PDCCH.

The information transmitted to the group via the group common DCI includes the dynamic SFI. That is, the dynamic SFI included in the group common DCI may update a resource defined by a flexible symbol in a semi-statically configured slot format with a DL symbol or a UL symbol or the like. There is a UE specific SFI table that each UE can have, and the dynamic SFI may include information on the index of the corresponding table.

Hereinafter, the present invention regarding SFI and measurement is described according to embodiments of the present invention.

When semi-static DL/UL configuration is given and/or dynamic SFI is indicated by group common PDCCH, there may be resource type which is defined as flexible resource (or, flexible symbol). When semi-static DL/UL configuration and/or dynamic SFI is not given, the default resource type may be determined as follows.

(1) The default resource type may be DL resource. At least, some DL resources may be used for measurement by SS/PBCH block configuration or CSI-RS configuration. For example, the resources where SS/PBCH block candidates are specified may be considered as DL resource, without any signaling or when the signaling (either semi-static or dynamic) is not configured.

In terms of neighbor cell measurement, one of the following two options may be considered.

Option 1: For neighbor cell measurement, the same DL resource or synchronized DL resource may be used among cells in the same frequency. In other words, the same location where SS/PBCH block is present and/or candidate SS/PBCH blocks are present may also be used among neighbor cells. Thus, when a UE has found the SS/PBCH block of one cell, the same locations may be used for neighbor cells as well. This may be realized by the assumption that cells are synchronized (in terms of measurement) or the same SS/PBCH block locations are used among cells.

Option 2: The same SS/PBCH block location among cells may not be assumed. A UE needs to search SS/PBCH block of each cell. The location may be different for each cell. In this case, assistance information on candidate location of SS/PBCH blocks for each cell may be configured by another cell (e.g. PCell).

When different options are used, reference signal received power (RSRP) may be measured accordingly depending on its assumption on SS/PBCH block locations.

In terms of reference signal strength indication (RSSI) measurement, the following options may be considered.

RSSI may be only measured in symbols where candidate SS/PBCH blocks are located. The location of the candidate SS/PBCH blocks may be determined based on the above mechanism (i.e. either by signaling or by assuming the same location as the one cell or by finding by a UE). To reflect RSSI appropriately, RSSI bandwidth may be defined as [UE minimum bandwidth—SS/PBCH block bandwidth] or [system minimum bandwidth—SS/PBCH block bandwidth]. The RSSI bandwidth may be located around SS/PBCH block or one adjacent side of SS/PBCH block (either lower or higher frequency region).

When system bandwidth is not larger than SS/PBCH block (or when the UE does not have information on system bandwidth), RSSI may not be measured at the same symbols to SS/PBCH block. Instead, at least few symbols before SS/PBCH block and symbols between SS/PBCH blocks may be considered as DL resources in a slot where at least one SS/PBCH block candidate is present, and such symbols may be used for RSSI measurement. Alternatively, from the first symbol of each slot (effective first symbol by excluding reserved resource) to the end of last actually transmitted SS/PBCH block in each slot may be considered as DL resource, and such DL resource may be used for RSSI measurement. If actually transmitted SS/PBCH block information is not available, only one symbol before detected SS/PBCH block may be considered as DL resource for RSSI measurement.

To allow UL resources to be used when one or more candidates of SS/PBCH blocks are not used for actually transmitted SS/PBCH block, the bitmap informing the actually transmitted SS/PBCH block in RMSI may be used to determine the location of the actually transmitted SS/PBCH block of a cell.

When the location of the actually transmitted SS/PBCH block is determined, the same symbol to the actually transmitted SS/PBCH block may be used for RSSI measurement if the same SS/PBCH block locations or same assumption on DL resources may be used among cells. Whether a UE can consider the same DL symbols for RSSI/RSRP measurement may be indicated (e.g. sameDLinSSblock) similar to the same multicast service single frequency network (MBSFN) configuration indication used in LTE. If the UE can consider the same DL symbols for RSSI/RSRP measurement by the indication, the UE may assume the same DL symbols for RSSI/RSRP measurement, and one of the cell's actually transmitted SS/PBCH block may be used for neighbor cells as well. In this case, before the actually transmitted SS/PBCH block, at least two symbols may be considered as DL symbols additionally for RSSI measurement. If both SS/PBCH blocks are transmitted in a slot, a UE may consider that symbols before SS/PBCH block and symbols between SS/PBCH blocks are also DL symbols.

Or, the UE may need to find the SS/PBCH block of each cell respectively.

If a UE is configured with CSI-RS, similar to SS/PBCH block, the symbol used for CSI-RS transmission may be considered as DL symbols. RSSI may be measured in non-CSI-RS resources.

(2) A set of minimum slots may be considered as DL resources. For example, slot i (in every 5 msec) may be considered as DL slot, and at least K symbols from the starting of slot may be considered as DL resources. A UE may measure RSSI in the DL slots at least. Additional DL resources may also be configured.

(3) A set of slots may be configured as DL resources for RSSI measurement. For the measurement, in addition to one of the approaches mentioned above or by default, resources used for RSSI measurement may be configured. The configuration which may be used for initial access without assisting cell may be as follows.

By default, RSSI may be measured on resources within SS/PBCH block where PSS/SSS has not been mapped. At least two symbols of 12 RBs may be used for RSSI measurement. Whether a UE may use additional resources beyond this resource may be implicitly configured.

Additional frequency resource may be used depending on frequency band. For example, per each band, a UE may use additional bandwidth that RSSI can be different. For example, for below 6 GHz, additional bandwidth for RSSI is zero, whereas for above 6 GHz, additional bandwidth of M MHz can be used for RSSI measurement. The M MHz may be lower or higher frequency of SS/PBCH block.

In case of FDD band, all resources where SS/PBCH block is transmitted may be considered as DL resources. RSSI measurement may be performed within the entire slot.

In case of TDD band, default DL/UL configuration may be used per frequency band. For example, default DL/UL configuration which contains minimum set of DL resources per frequency band may be pre-defined. The UE may measure RSSI in the configured minimum set of DL resources. Similarly, for UE-to-UE measurement, or transmission/reception point (TRP)-to-TRP measurement, fixed UL resource may be used. For default DL/UL configuration, candidate SS/PBCH block per each frequency band may be considered as DL resources without explicit UL resources. Additional resources before and/or after SS/PBCH block may also be used.

RSSI measurement may always be based on some configuration. First, a UE searches SS/PBCH block blindly where only RSRP is measured. Once the UE acquires PBCH and/or RMSI, the UE may acquire DL resources for RSSI measurement. One example of the DL resources for RSSI measurement is the system bandwidth or measurement bandwidth where RSSI can be measured, and/or symbols where SS/PBCH block is actually transmitted. Once the UE acquires the DL resources for RSSI measurement, whether the same DL resources for RSSI measurement can be used among cells or not may also be signaled by measurement related configuration in RMSI. Alternatively, RMSI may indicate default DL/UL configuration with the flag informing whether the same configuration can be used for neighbor cells or not.

In this case, for the initial measurement, only RSRP may be measured. RSSI may also be measured based on UE implementation, and a UE consider certain resources as DL resources based on certain configurations such as paging configurations. In other words, if the UE has not acquired any information in that frequency, the UE may measure only RSRP, and measure RSSI additionally once the UE knows more about the DL resources for RSSI measurement.

(4) Alternatively, a set of DL slots or default DL/UL configuration may be indicated in one of SIB, and a UE may perform measurement (for both RSRP and reference signal received quality (RSRQ) or only for RSRQ) for the cell broadcasting the SIB. Different set may be configured to the serving cell and neighbor cells per frequency, respectively. The purpose of this different set is to configure measurement resources differently for serving cell and neighbor cells in which different DL resources are used.

The default DL/UL configurations, and/or default DL resources considered by the UE for measurement and/or for the serving cell may also be used for other purposes, such as discontinuous reception (DRX) and/or fallback DCI transmission. If there is a cell-specific DL/UL configuration, the cell-specific DL/UL configuration may be used as default DL/UL configuration, and a UE may not use fallback DCI transmission in DL resources which is not default DL/UL resources. If there is no cell-specific DL/UL configuration, default DL/UL resources may be configured based on SS/PBCH block and/or PRACH configurations. Alternatively, fallback DCI may be transmitted in any time.

In terms of DRX on timer and/or OnDuration timer, only DL resources following default DL/UL configuration and/or UE specific DL/UL configuration may be counted. When group common PDCCH indicates SFI, and thus, a UE cannot assume DL or UL resource, default DL/UL configuration for DRX purpose may be configured. Or, a UE may monitor group common PDCCH during DRX. Or, the UE may count all resources as DL resources for DRX purpose.

During DRX, the measurement may be performed based on default DL/UL configuration, and/or DL resource configuration for fixed DL for measurement specifically. When a UE acquires the information on fixed DL configuration via RMSI and/or other cell specific broadcast signaling, whether it is used for measurement or not may depend on whether the UE can use the same configuration for all neighbor cells or not. If the same configuration cannot be used for neighbor cells, the UE may use only DL resources in initial cell search (unless it is configured otherwise). If the same configuration can be used for neighbor cells, the new configuration may be used for the measurement.

Different default configuration may be used for SS/PBCH block and CSI-RS based measurement. CSI-RS based measurement may follow explicit interference measurement resource (IMR) and CSI-RS configurations. That is, interference measurement resources may also be explicitly configured.

In configuring a default DL/UL configurations and/or measurement resource configurations, the following approaches may be considered.

(1) Slot level configuration: Based on a reference numerology, slot-level resources may be configured, and a subset of slots may be used for measurement based on DL signals or measurements on DL resources. The reference numerology may be defined as the numerology of SS/PBCH block in a frequency range, or defined per frequency range, or configured along with the resource set. The periodicity may be 5 ms (the number of slots may be different depending on reference numerology) or multiple of 5 ms or may be fixed to such as P slots. By this approach, overhead can be reduced.

(2) Symbol level configuration based on SFI patterns: By this approach, {reference numerology, periodicity, SFI patterns during P slots} may be indicated. There may be a set of SFIs defined in the specification. For example, SFI pattern may include K number of DL symbols, K2 number of unknown (flexible) symbols and K3 number of UL symbols. Various SFI patterns over one or more slots may be defined in the specification, and set of SFI patterns may be configured to a UE via group common PDCCH. There may also be a set of SFI patterns predefined for measurement purpose. The set of SFI patterns for measurement purpose may be different per frequency band. The set of SFI patterns for measurement purpose may be semi-statically configured by RMSI. Or, the whole set of SFI patterns may be used for configuration. Based on SFI patterns used for the configurations, the configuration may indicate periodicity and patterns used in each interval.

(3) To minimize the signaling overhead, only DL resources excluding UL resources or flexible resources may be indicated. For this, symbols of each slot may be grouped as follows.

In a slot where one or more candidates of SS/PBCH blocks are present, and when the numerology of RMSI and SS/PBCH blocks are the same, two groups of symbols may be formed. The first group may include symbols from the first symbol to end symbol of first candidate of SS/PBCH block, and the second group may include symbols from the next symbol of the first candidate of SS/PBCH block to the end of second candidate of SS/PBCH block. In case of LTE-NR coexistence, the first group may not include symbols before first SS/PBCH block. The information on such symbols may be known to the UE in RMSI.

In a slot where one or more candidates of SS/PBCH blocks are present, the numerology of RMSI and SS/PBCH blocks may be different. If the numerology of RMSI is higher than that of SS/PBCH block (e.g. 30 kHz subcarrier spacing for RMSI, 15 kHz subcarrier spacing for SS/PBCH block), the slot based on RMSI numerology which contains one SS/PBCH block may be considered as one group. If the numerology of RMSI is lower than that of SS/PBCH block (e.g. 15 kHz subcarrier spacing for RMSI, 30 kHz subcarrier spacing for SS/PBCH block), two groups of symbols may be formed. The first group may include symbols from the first symbol of a slot based on RMSI numerology to the end of second SS/PBCH block candidate in the slot, and second group may include symbols from the next OFDM symbol of the second SS/PBCH block candidate to the fourth SS/PBCH block candidate. Similar to the above mechanism, one group may include symbols before SS/PBCH block and symbols carrying SS/PBCH block.

In a slot without SS/PBCH block candidate, one group of symbols may be formed. The size or the number of symbols included in the group may be predefined and/or configured by higher layer signaling.

Based on either semi-static DL/UL configuration or PRACH configuration, UL resources may be excluded. For example, some group of symbols may be excluded as it is known as UL resources.

Within a periodicity (e.g. 5 ms), multiples of such groups may indicated as bitmap. Each bit may indicate '1' if the group of symbols is DL resources, '0' if the group of symbols is UL or flexible resources. Or, each bit may indicate '1' if the group of symbols can be used for measurement for DL.

In case of 30 kHz subcarrier spacing SS/PBCH block where consecutive SS/PBCH blocks are used, a group may include 4 symbols before the first SS/PBCH block and SS/PBCH block, and another group may include second SS/PBCH block if the numerology of RMSI and SS/PBCH blocks are same. If RMSI uses 15 kHz subcarrier spacing, 2 symbols before first SS/PBCH block and first and second SS/PBCH blocks may form one group.

To reduce the overhead or reduce the number of groups for measurement configuration indication, each group may include symbols from the first symbol of a slot and the last symbol. The last symbol may be determined by various scheme as follows. In a slot containing candidate SS/PBCH block, the last symbol may be determined by indication of actually transmitted SS/PBCH block. If there is one or more than SS/PBCH blocks are indicated as actually transmitted, the last actually transmitted SS/PBCH block may be used to determine the last OFDM symbol. Alternatively, in a slot containing candidate SS/PBCH block, if there is no actually transmitted SS/PBCH block, higher layer configuration and/or predefined value may be used to determine potential DwPTS region. Alternatively, in a slot not containing candidate SS/PBCH block, higher layer configuration and/or predefined value may be used to determine potential DwPTS region.

In other words, from the staring symbol of slot to the end of actually transmitted SS/PBCH block may be considered as DL resource without additional indication. Furthermore, each group may exclude control region (one or two symbols of each slot) to exclude interference from control transmission.

(4) Numerology of RMSI may be different from numerology of SS/PBCH block. The numerology of RMSI may be used for measurement including interference measurement other than RSRP based on SS/PBCH block. The slot format may be based on the numerology of RMSI.

Figure 10:
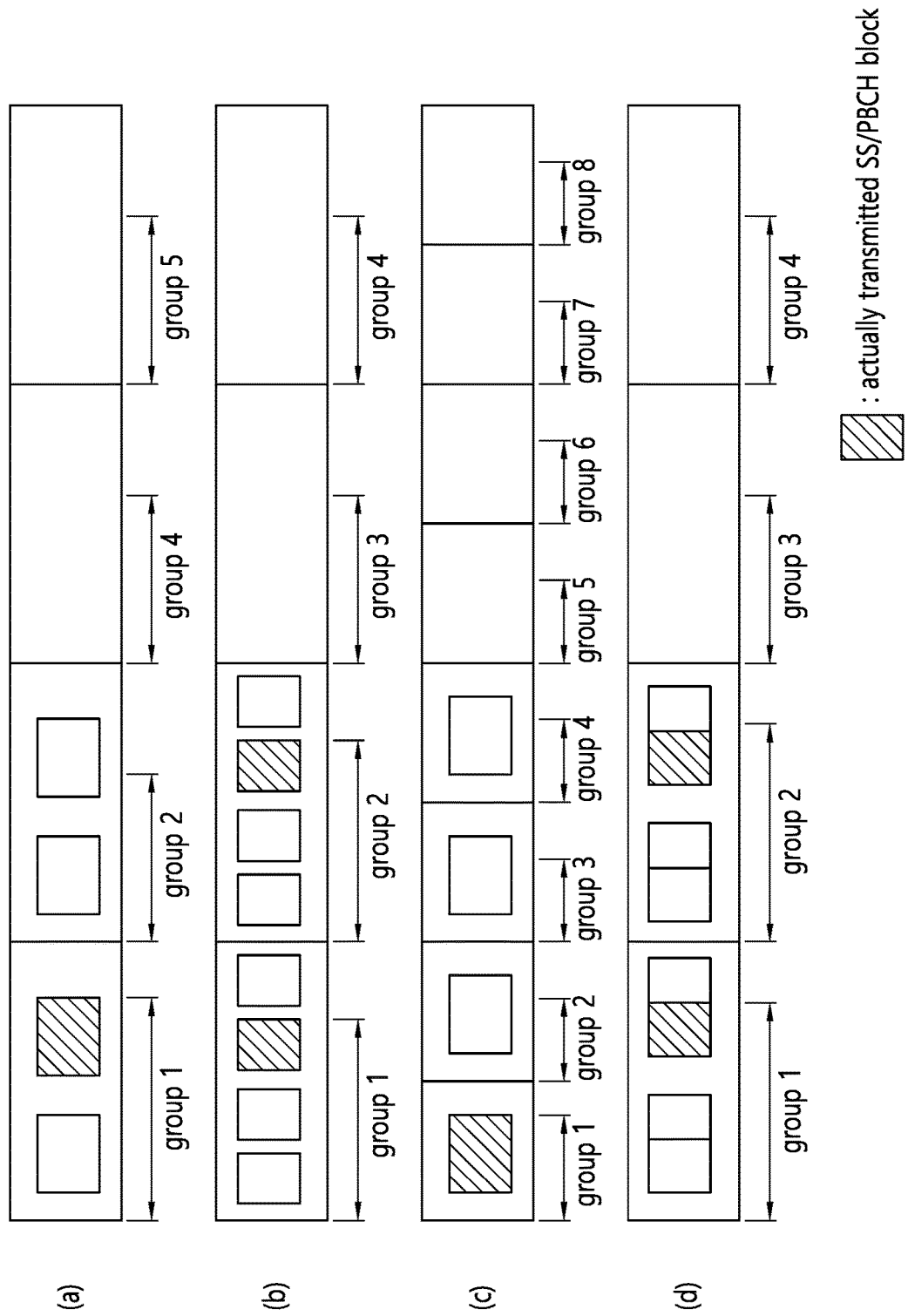
FIG. 10 shows an example of a group of symbols indicating symbols for measurement according to an embodiment of the present invention.

FIG. 10 shows an example of a group of symbols indicating symbols for measurement according to an embodiment of the present invention. FIG. 10-(a) shows a case that numerology of RMSI and SS/PBCH block is same, and each group of symbols includes control region. FIG. 10-(b) shows a case that numerology of RMSI is lower than the numerology of SS/PBCH block, and each group of symbols includes control region. FIG. 10-(c) shows a case that numerology of RMSI is higher than the numerology of SS/PBCH block, and each group of symbols includes control region. FIG. 10-(d) shows a case that numerology of RMSI is lower than the numerology of SS/PBCH block, and each group of symbols includes control region. In each case, each group include symbols from the first symbol of a slot to the end of actually transmitted SS/PBCH block.

For example, in case of FIG. 10-(d), size of 4 bits of bitmap may be used to represent 4 groups, and the indicated group may be used for measurement. Measurement bandwidth may also be configured separately. If measurement bandwidth is same as SS/PBCH block, groups indicating only symbols in SS/PBCH block may be excluded because there is no resources left for interference measurement.

Also, without explicit measurement configurations, the resources from the starting of a slot to the end of actually transmitted SS/PBCH block may be used for DL resources except for LTE-NR coexistence case. In case of LTE-NR coexistence case, to be safe, first 3 symbols based on 15 kHz subcarrier spacing may be excluded from the measurements. In terms of system frame number (SFN), if NR uses 15 kHz subcarrier spacing as well for RMSI, the first 3 symbols in each slot may be excluded (2 symbols in MBSFN subframe). If NR uses 30 kHz or 60 kHz subcarrier spacing, SFN 0 of NR and SFN 0 of LTE may be aligned in terms of this operation. That is, every even slots may exclude 6 symbols from the measurement for 30 kHz subcarrier spacing, and every 4th slots may exclude 12 symbols from the measurement for 60 kHz subcarrier spacing.

In multi-beam scenarios, interference may be measured when the target beam is used for transmission. In this sense, for each SS/PBCH block, different resources may be configured for interference measurements. If the configuration is not given, the UE may perform measurement by utilizing the same symbols where SS/PBCH block with that beam is transmitted or one or a few symbols before the SS/PBCH block including symbols carrying SS/PBCH blocks. In other words, each group including a specific SS/PBCH block with a certain beam direction may be used as default interference measurement resource, and additional interference measurement resource may also be indicated per SS/PBCH block index or per beam or per TRP.

In summary, the followings may be considered for measurement resources.

1. Scenario 1: A UE is not indicated with additional information for measurement resources. In this scenario, the following options may be considered.

(1) Option 1: Symbols carrying the detected SS/PBCH block may be considered as DL resources, and no other resources may be considered as DL resources. At least resources not used for PSS/SSS may be used for RSSI measurement.

(2) Option 2: Symbols carrying the detected SS/PBCH block and at least one additional symbol before SS/PBCH block may be considered as DL resources. To address LTE-NR coexistence case where there is no additional resource for NR before SS/PBCH block (at least first SS/PBCH block candidate), this option may be only used in a band which is not shared with LTE. Alternatively, this option may be used in all bands/carriers and the network may need to ensure the measurement resource.

(3) Option 3: Symbols from the first symbol of a slot (if slot boundary is known) to the end of SS/PBCH block in the given slot may be considered as DL resources. In case of LTE-NR coexistence, first two symbols based on 15 kHz subcarrier spacing may be used for LTE only.

(4) Option 4: Based on the above description, 1, 2 or 4 symbols prior to the detected SS/PBCH block and the symbols within the detected SSB SS/PBCH block may be considered as the RSSI measurement resources. The actual number of symbols prior to the detected SS/PBCH block may depend on the subcarrier spacing (i.e. numerology) of SS/PBCH block and/or SS/PBCH composition pattern.

Figure 11:
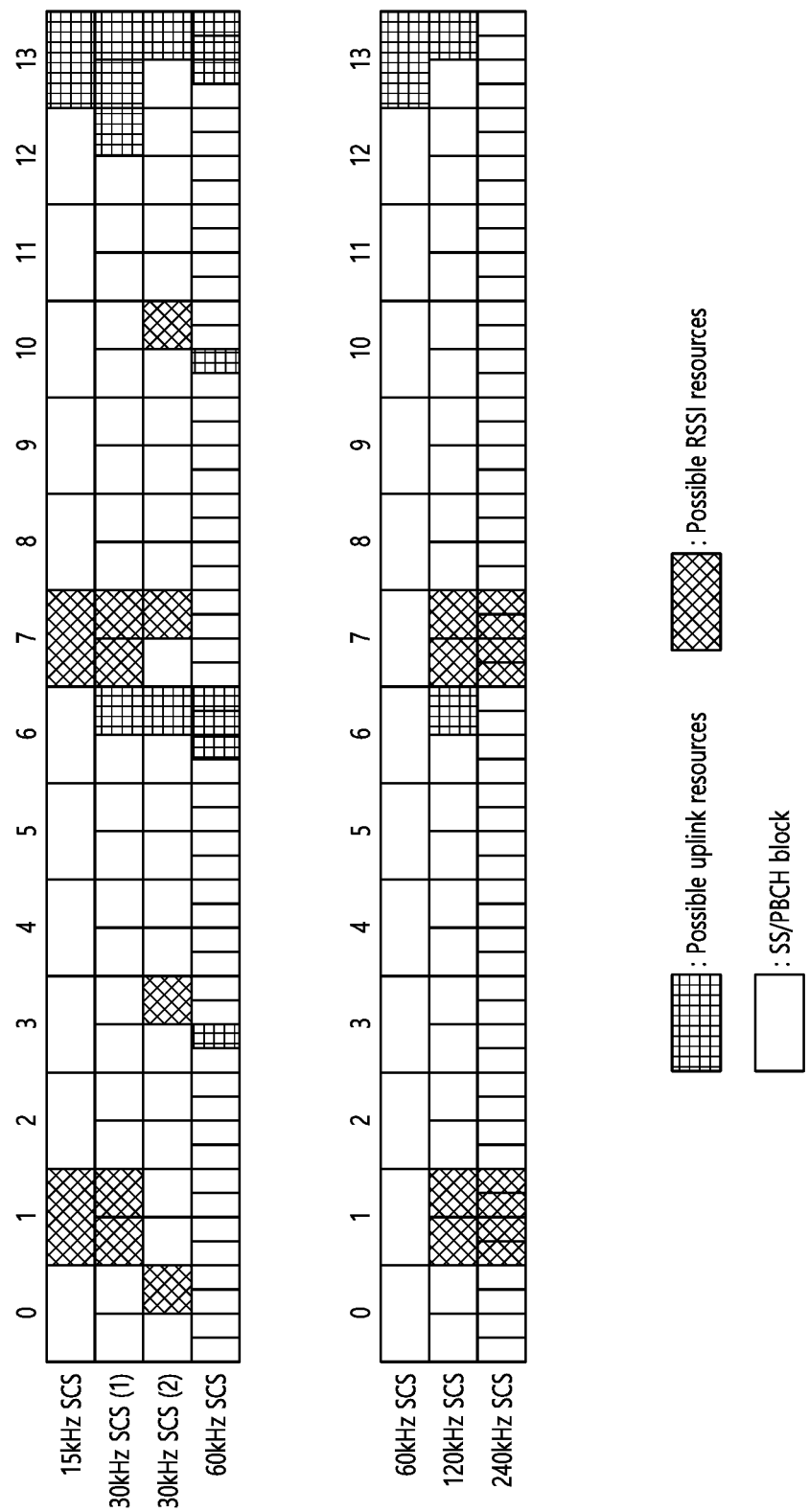
FIG. 11 shows an example of measurement resources according to an embodiment of the present invention.

FIG. 11 shows an example of measurement resources according to an embodiment of the present invention. Referring to FIG. 11, 1 symbol may be considered as the RSSI measurement resources for 15 kHz subcarrier spacing and/or 30 kHz subcarrier spacing pattern 2. 2 symbols may be considered as the RSSI measurement resources for 30 kHz subcarrier spacing pattern 1 and/or 120 kHz subcarrier spacing. 4 symbols may be considered as the RSSI measurement resources for 240 kHz subcarrier spacing.

In other words, depending on numerology, considering possible alignment between SS/PBCH block and RMSI, and/or between SS/PBCH blocks with different numerologies in a given frequency band, different number of symbols before (or after) SS/PBCH block may be used additionally as a valid measurement resource. The maximum number of symbols may be defined per frequency band, based on the lowest subcarrier spacing used in that frequency band/range (e.g. for below 6 GHz, maximum 1 symbol of 15 kHz subcarrier spacing before SS/PBCH block is used/for above 6 GHz, maximum 1 symbol of 6 kHz subcarrier spacing). Particularly, the number of symbols may be used within one slot. If there are multiple SS/PBCH blocks in a slot, the number of symbols may be evenly distributed before each SS/PBCH block. If SS/PBCH blocks are adjacent, the additional symbol may be added in front of the first SS/PBCH block. Based on the information, for 30 kHz subcarrier spacing with different SS/PBCH block formation, different RSSI resources or resources which may be used for RSSI measurement or DL resources may be determined as shown in FIG. 11 above.

2. Scenario 2: A UE is indicated with additional information for measurement resources. The measurement resources may be determined based on the additional information. In this scenario, the following options may be considered.

Option 1: Symbols carrying SS/PBCH block may be considered as DL/measurement resources based on actually transmitted SS/PBCH block. OFDM. Depending on whether RSSI is measured independently per beam or not, interference measurement may be performed differently. Similar to the above options, different alternatives regarding measurement resources may be considered.

Option 2: The measurement resources may be determined based on actually transmitted SS/PBCH block & LTE-NR coexistence & reserved resource configuration. Unless otherwise indicated, a UE may consider that the used SS/PBCH blocks are coordinated among the cells in the same frequency. Once the UE acquires actually transmitted SS/PBCH block from a cell, the UE consider that the same information is used among the cells based on the assumption that cells are synchronized and coordinated. This may not be necessary for FDD case where DL carrier can be used as measurement resources, or a subset of slots (predefined) can be use as measurement resources. The resources for actually transmitted SS/PBCH block, and bandwidth configured for RMSI including CORESET may be at least used for measurement. Except for the reserved symbols by LTE-NR coexistence or reserved resource configuration, symbols from the first symbol in a slot to the end of actually transmitted SS/PBCH block in the given slot may be considered as DL resources and/or measurement resources. Or, conservatively, symbols carrying the detected SS/PBCH block and at least one additional symbol before SS/PBCH block may be considered as DL resources.

When implicit decision is made, for interference measurement, interference averaging may be performed at the periodic resources aligned with the same beam SS/PBCH blocks. For example, if SS/PBCH block periodicity with the same beam is 20 ms, interference resource may also have periodicity of 20 ms. Alternatively, interference measurement may be averaged over all measurement resources. In other words, RSRP may be measured per SS/PBCH block with a beam direction or CSI-RS with a beam direction, whereas RSSI may be measured over any DL resources (i.e. a single RSSI is measured). Or, RSRP and RSSI may be measured per a beam direction, and the resource for RSRP measurement and RSSI measurement may be implicitly or explicitly configured per different beam. Which approach to use may also depend on whether interference measurement resource is explicitly configured or not, or may also depend on which RS is used for measurement. For example, if explicit configuration of IMR per beam is used, second approach may be used. Also, for example, if RSRP is measured based on CSI-RS, second approach may be used.

Option 3: Option 2 may be used, and in addition, information regarding RMSI transmission may also be considered as DL resources. For example, in addition to actually transmitted SS/PBCH block, symbols carrying RMSI CORESET and RMSI may be considered as DL resources and/or measurement resources. If RMSI resources are rather fixed, otherwise, resources for RMSI CORESET may only be considered as DL resources and/or measurement resources.

Option 4: RMSI may indicate a set of DL resources used for DL measurement per each beam. Each RMSI associated with each beam may indicate DL resources for measurement respectively. If shared RMSI is used for all beams, all resources may be configured as well or a common set of measurement resources may be configured. In other words, if RSRP and RSSI both are separately measured per beam, separate interference resources configuration may be necessary per beam. Otherwise, a shared or common configuration may be used. Also, if RSRP and RSSI are separately measured per each beam, symbols may be grouped per SS/PBCH block. In other words, if there are more than one SS/PBCH block candidates in a slot, multiple groups of symbols may be formed. If a slot does not have any SS/PBCH block candidate, there may be only one group or multiple groups based on mini-slot partitioning.

Figure 12:
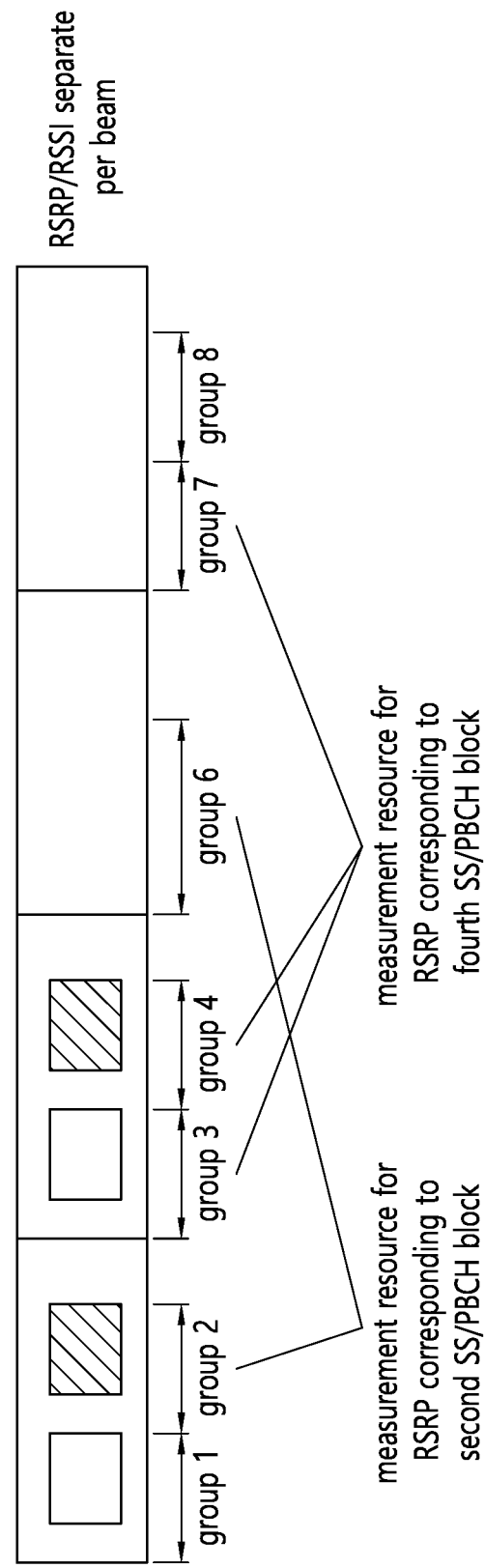
FIG. 12 shows another example of measurement resources according to an embodiment of the present invention.

FIG. 12 shows another example of measurement resources according to an embodiment of the present invention. Referring to FIG. 12, if RSRP and RSSI both are separately measured per beam, symbols are grouped per SS/PBCH block. Group 2/6 may correspond to measurement resources for RSRP measurement corresponding to second SS/PBCH block. Group 3/4/7 may correspond to measurement resources for RSRP measurement corresponding to fourth SS/PBCH block. This case may be more efficient in case of beam coordination among cells. The number of groups per slot may be configured or predefined or configured differently per slot.

A UE may follow no additional information case or additional information case depending on its procedure. For example, a UE may need to access at least one cell's RMSI and/or other SI (OSI) in a given frequency (unless the UE obtained the information by some other means, e.g. by assisting cell) at least in TDD NR band, because the UE does not know the resource direction of the cell unless there are fixed measurement resources. If this is mandated, a UE may assume that information is obtained, and follow the information/configurations.

In FDD, in DL spectrum, at least partial slots or resources may be considered as DL resources.

3. Scenario 3: Inter-frequency measurement

The above options described in scenario 1 and/or 2 may be applied when intra-frequency measurement is performed. For inter-frequency measurement, the following options may be considered.

(1) Option 1: Additional information for measurement resources may be not given by a serving cell. Any additional information for measurement resources may be not given except for the cell frequency (and possibly measurement bandwidth). In this case, the above options described in scenario 1 and/or 2 for the case without any additional information for measurement resources may be followed.

Information on actually transmitted SS/PBCH block of the target frequency may be indicated. To derive timing, the offset between assisting cell's slot index or SFN index to target cell may also be indicated. The offset may include offsets in terms of number of slots, and/or the number of symbols. Further, the numerology which the UE needs to use for measurement in the target frequency may also be indicated. Based on this indication, if there is no additional information for measurement resources, a UE may consider DL resources and/or measurement resources around SS/PBCH block as described above (i.e. options without any assistance information for measurement resources in Scenario 1).

Similar to Scenario 2, different signaling options may be possible, and necessary additional information such as timing offset between assisting cell and numerology used in target frequency may be needed.

(2) Option 2: Additional information for measurement resources may be given by a cell in the measurement frequency. The case may be similar to Scenario 1 or 2.

Figure 13:
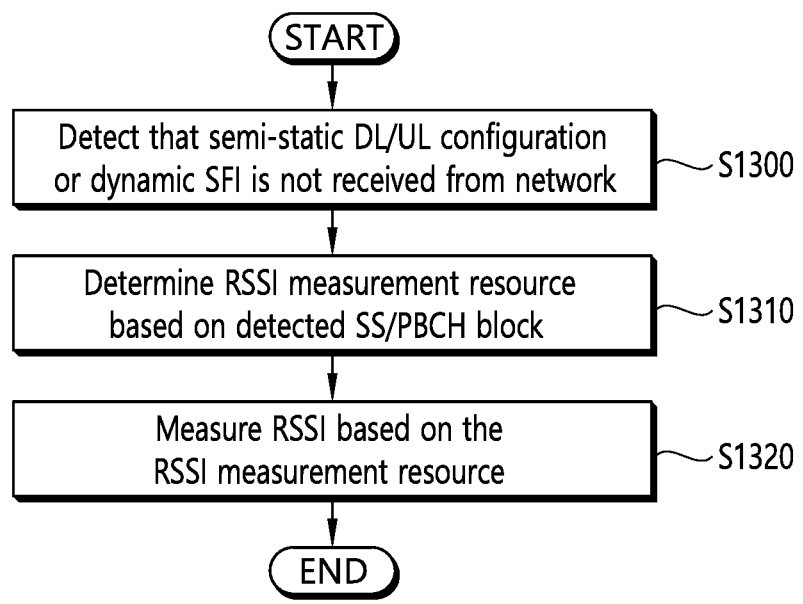
FIG. 13 shows a method for measuring RSSI by UE according to an embodiment of the present invention.

FIG. 13 shows a method for measuring RSSI by UE according to an embodiment of the present invention. The present invention described above may be applied to this embodiment.

In step S1300, the UE detects that a semi-static DL/UL configuration or a dynamic SFI is not received from a network.

In step S1310, the UE determines RSSI measurement resources based on detected SS/PBCH block. The RSSI measurement resources may include at least one of symbols before (or after) the detected SS/PBCH block, in addition to symbols within the detected SS/PBCH block. A number of the symbols before (or after) the detected SS/PBCH block may depend on at least one of a numerology for the detected SS/PBCH block or a composition pattern of the detected SS/PBCH block. A maximum number of the symbols before (or after) the detected SS/PBCH block may be configured per frequency band based on a lowest subcarrier spacing used in a frequency range. The detected SS/PBCH block may be a first SS/PBCH block among a plurality of SS/PBCH blocks in a slot.

In step S1320, the UE measures the RSSI based on the RSSI measurement resources.

According to an embodiment of the present invention shown in FIG. 13, even when the semi-static DL/UL configuration and/or dynamic SFI is not indicated to the UE, the UE can determine measurement resources implicitly and perform RSSI measurement effectively.

Figure 14:
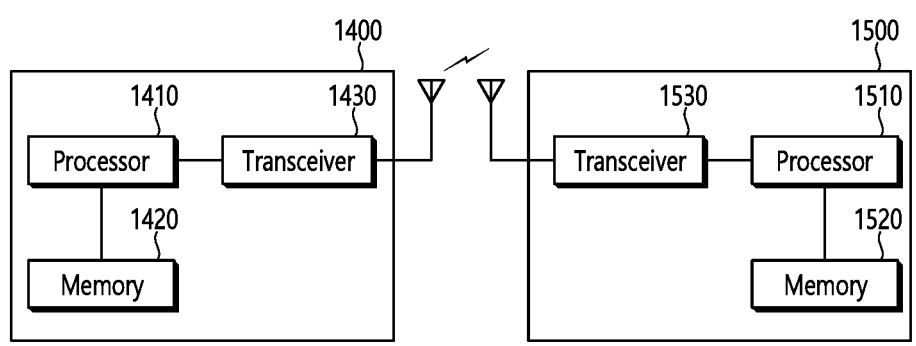
FIG. 14 shows a wireless communication system to implement an embodiment of the present invention.

FIG. 14 shows a wireless communication system to implement an embodiment of the present invention.

A UE 1400 includes a processor 1410, a memory 1420 and a transceiver 1430. The processor 1410 may be configured to implement proposed functions, procedures and/or methods described in this description. Layers of the radio interface protocol may be implemented in the processor 1410. Specifically, the processor 1410 detects that a semi-static DL/UL configuration or a dynamic SFI is not received from a network, determines RSSI measurement resources based on detected SS/PBCH block, and measures a RSSI based on the RSSI measurement resources.

The RSSI measurement resources may include at least one of symbols before (or after) the detected SS/PBCH block, in addition to symbols within the detected SS/PBCH block. A number of the symbols before (or after) the detected SS/PBCH block may depend on at least one of a numerology for the detected SS/PBCH block or a composition pattern of the detected SS/PBCH block. A maximum number of the symbols before (or after) the detected SS/PBCH block may be configured per frequency band based on a lowest subcarrier spacing used in a frequency range. The detected SS/PBCH block may be a first SS/PBCH block among a plurality of SS/PBCH blocks in a slot.

The memory 1420 is operatively coupled with the processor 1410 and stores a variety of information to operate the processor 1410. The transceiver 1430 is operatively coupled with the processor 1410, and transmits and/or receives a radio signal.

A network node 1500 includes a processor 1510, a memory 1520 and a transceiver 1530. The processor 1510 may be configured to implement proposed functions, procedures and/or methods described in this description. Layers of the radio interface protocol may be implemented in the processor 1510. The memory 1520 is operatively coupled with the processor 1510 and stores a variety of information to operate the processor 1510. The transceiver 1530 is operatively coupled with the processor 1510, and transmits and/or receives a radio signal.

The processors 1410, 1510 may include application-specific integrated circuit (ASIC), other chipset, logic circuit and/or data processing device. The memories 1420, 1520 may include read-only memory (ROM), random access memory (RAM), flash memory, memory card, storage medium and/or other storage device. The transceivers 1430, 1530 may include baseband circuitry to process radio frequency signals. When the embodiments are implemented in software, the techniques described herein can be implemented with modules (e.g., procedures, functions, and so on) that perform the functions described herein. The modules can be stored in the memories 1420, 1520 and executed by the processors 1410, 1510. The memories 1420, 1520 can be implemented within the processors 1410, 1510 or external to the processors 1410, 1510 in which case those can be communicatively coupled to the processors 1410, 1510 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) operating in a wireless communication system, the method comprising:
    detecting a synchronization signal (SS)/physical broadcast channel (PBCH) block transmitted from a network;
    detecting that a semi-static downlink/uplink (DL/UL) configuration or a dynamic slot formation indication (SFI) is not received from the network;
    determining reference signal strength indication (RSSI) measurement resources using the detected SS/PBCH block based on the semi-static DL/UL configuration or the dynamic SFI not being received from the network; and
    measuring an RSSI based on the RSSI measurement resources.

2. The method of claim 1, wherein the RSSI measurement resources include at least one symbol before the detected SS/PBCH block.

3. The method of claim 2, wherein the number of symbols before the detected SS/PBCH block depends on at least one of a numerology for the detected SS/PBCH block or a composition pattern of the detected SS/PBCH block.

4. The method of claim 2, wherein a maximum number of symbols before the detected SS/PBCH block is configured per frequency band based on a lowest subcarrier spacing used in a frequency range.

5. The method of claim 1, wherein the RSSI measurement resources include at least one symbol within the SS/PBCH block.

6. The method of claim 1, wherein the RSSI measurement resources include at least one symbol after the detected SS/PBCH block.

7. The method of claim 1, wherein the detected SS/PBCH block is a first SS/PBCH block among a plurality of SS/PBCH blocks in a slot.

8. The method of claim 1, wherein the UE is in communication with at least one of a mobile device, a network, and/or autonomous vehicles other than the UE.

9. A user equipment (UE) configured to operate in a wireless communication system, the UE comprising:
    a memory;
    a transceiver; and
    a processor, operably coupled to the memory and the transceiver, and configured to:
    detect a synchronization signal (SS)/physical broadcast channel (PBCH) block transmitted from a network;
    detect that a semi-static downlink/uplink (DL/UL) configuration or a dynamic slot formation indication (SFI) is not received from the network;
    determine reference signal strength indication (RSSI) measurement resources using the detected SS/PBCH block based on the semi-static DL/UL configuration or the dynamic SFI not being received from the network; and
    measure an RSSI based on the RSSI measurement resources.

10. The UE of claim 9, wherein the RSSI measurement resources include at least one symbol before the detected SS/PBCH block.

11. The UE of claim 10, wherein the number of symbols before the detected SS/PBCH block depends on at least one of a numerology for the detected SS/PBCH block or a composition pattern of the detected SS/PBCH block.

12. The UE of claim 10, wherein a maximum number of symbols before the detected SS/PBCH block is configured per frequency band based on a lowest subcarrier spacing used in a frequency range.

13. The UE of claim 9, wherein the RSSI measurement resources include at least one symbol within the SS/PBCH block.

14. The UE of claim 9, wherein the RSSI measurement resources include at least one symbol after the detected SS/PBCH block.

15. The UE of claim 9, wherein the detected SS/PBCH block is a first SS/PBCH block among a plurality of SS/PBCH blocks in a slot.

\* \* \* \* \*